United States Patent Office 3,029,774
Patented Apr. 17, 1962

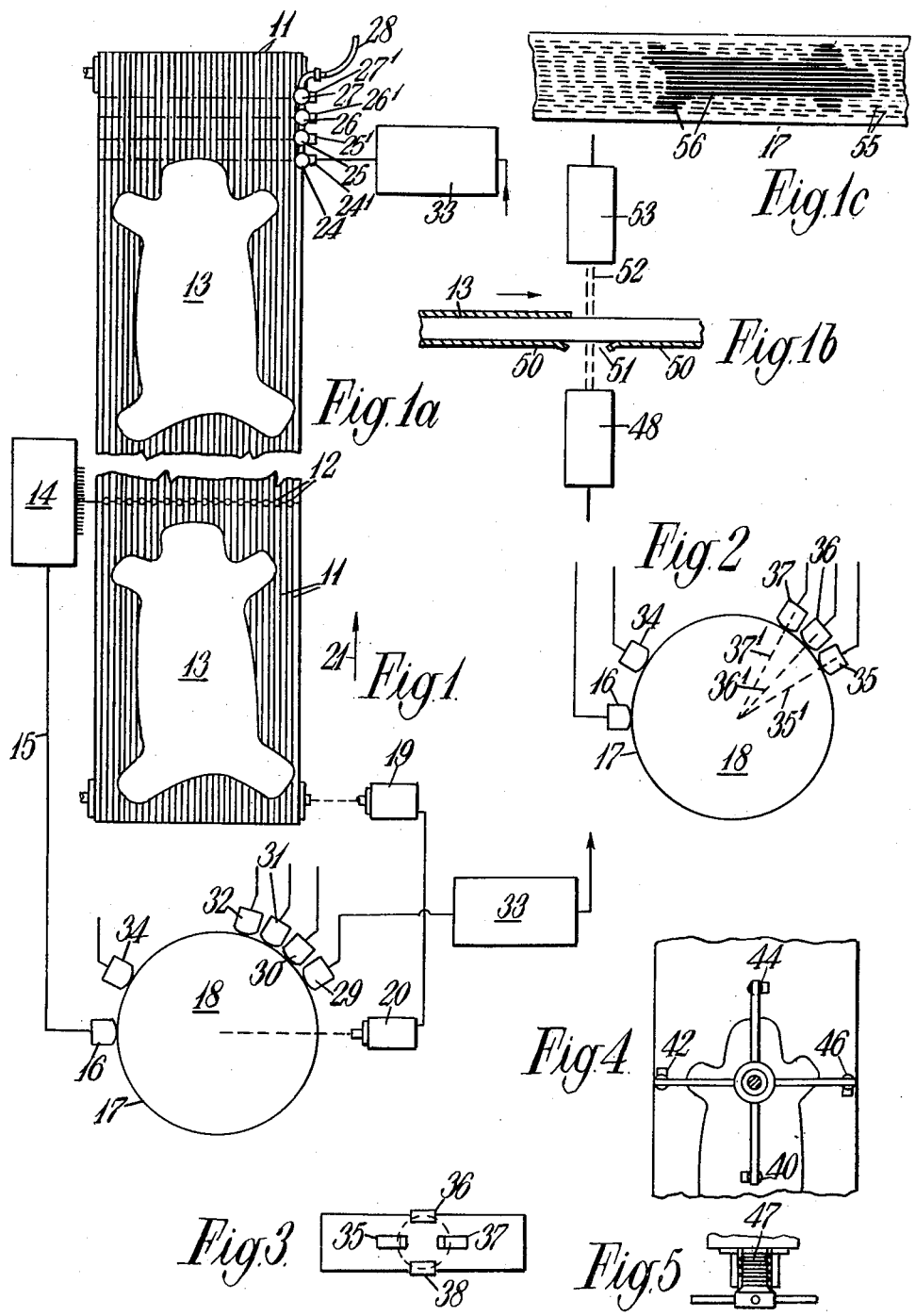

3,029,774
APPARATUS FOR CARRYING OUT AN OPERATION ACCORDING TO A PATTERN
Laszlo Namenyi-Katz, Bedfont, Feltham, England, assignor to Epsylon Research and Development Company Limited, Bedfont, Feltham, England
Filed Mar. 3, 1959, Ser. No. 796,840
Claims priority, application Great Britain Nov. 13, 1958
13 Claims. (Cl. 118—2)

This invention relates to apparatus for carrying out an operation according to a pattern and more particularly to a kind of machine in which an operation of work is carried out by one part of the machine in accordance with a pattern which is contained in another part of the machine.

A variety of so-called copying machines is known in which a pattern in the form of a templet is slowly rotated and a feeler in contact with the edge of the templet is moved to and fro in accordance with the contour of the edge, the movement of the feeler being employed to control a work head which carries out an operation, for example milling or grinding, on a workpiece. A machine is also known in which a greatly enlarged drawing of the required shape of a workpiece is used as the pattern. A sensing head containing a photo-electric device is movable by means of a servo mechanism which is controlled by the photo-electric device, so that the sensing head follows the course of the dark outline representing the required shape. A second servo mechanism moves the work head containing the tool in accordance with the movements of the sensing head.

The object of the present invention is to provide apparatus in which a pattern, which may the actual article on which the operation is to be carried out, is traversed past a line of sensing devices connected to the individual heads of a line of electro-magnetic recording heads which are in contact with moving magnetic recording material so that as the pattern passes the sensing devices an analogue of its shape is magnetically recorded. The magnetic recording material then passes one or more reproducing heads which is/are traversed across its path and which deliver signals according to the recorded analogue. The work means are synchronously traversed across the path of the moving article and the signals from the reproducing head or heads are used to control the action of the work means.

Such apparatus may be adapted for a large variety of industrial purposes, particularly in cases where the articles upon which the desired operation is to be carried out are of individual and irregular shapes.

The invention consists of apparatus for carrying out an operation on an article comprising means to move a shaped pattern along a line, a plurality of sensing devices adapted to provide signals disposed in a fixed line across the line of pattern movement and responsive to the passage of any part of the pattern therepast, magnetic recording material, means to move the recording material is a predetermined path in synchronism with the pattern moving means, a plurality of electromagnetic recording heads equal to the number of sensing devices disposed in a line across the path of the recording material, each sensing device being connected to apply signals to the recording head in the corresponding position in the line, whereby synchronous movement of the pattern moving means and the recording material causes an analogue of the shape of the pattern to be magnetically recorded on the recording material, means to move the article along a line corresponding to the line of movement of the pattern moving means in synchronism with the movement of the recording material work means for carrying out the desired operation, means to move the work means in a desired path relative to the line of movement of the article, an electromagnetic reproducing head adapted to provide signals, means to move the reproducing head over the recording material in synchronism with the movement of the work means and in a path corresponding to the path thereof to scan the recorded analogue, and control means responsive to the signals from the reproducing head for actuating the work means, whereby the operation is carried out in accordance with the shape of the recorded analogue.

Preferably the pattern moves in a straight line and the sensing devices are disposed in a straight line transverse thereto. The article may also move in a straight line.

The recording material may be disposed around a rotatable drum.

Conveniently the path of the work means is transverse to the line of movement of the article and the path of the reproducing head is parallel to the axis of the drum.

A plurality of work means may be provided, together with an equal number of reproducing heads, the spacing of the work means along the line of movement of the article and the spacing of the reproducing heads along the path of the magnetic material being such that the time required for the article to move from one work means to the next is equal to the time required for the magnetic material to move from one reproducing head to the next.

In an alternative arrangement, a plurality of work means is arranged to follow a circular path over the article and a like number of reproducing heads may be arranged to follow a corresponding path over the magnetic material.

The means to move the pattern may be a conveyer and, where the article itself forms its own pattern, the means to move the article may be another part of the same conveyer. In an adaptation of the invention for spraying leather hides the work means may comprise one or more spray guns.

A magnetic erasing head may be provided adjacent the recording heads, arranged so that an analogue previously recorded is erased before a new analogue is recorded.

Although the invention may be applied in a variety of ways, it is well adapted for the spraying of leather hides and one embodiment for this purpose will now be described, by way of example, with reference to the accompanying drawings, of which, FIGURE 1 shows, in diagrammatic form, a part of apparatus according to the invention for the automatic spraying of leather hides;

FIGURE 1a shows the other part of the apparatus, after the conveyer has moved through some distance. FIGURE 1b is a vertical section on a line running between two of the belts of which the conveyer is comprised, showing a sensing device. FIGURE 1c shows a length of tape, indicating a recorded analogue of the shape of the pattern;

FIGURES 2 and 3 show an alternative arrangement of the reproducing heads;

FIGURE 4 shows an alternative arrangement of the spray guns; and

FIGURE 5 shows an arrangement of sliprings and brushes for controlling the actuators for the spray guns of FIGURE 4.

In FIGURE 1 there is shown means for moving a pattern, consisting of part of a conveyer which is made up of a number of individual belts 11. In other respects its construction is along normal lines. Suitable means (not shown) are provided for driving the conveyer at a constant speed. In each space between adjacent belts 11 is a sensing device 12, all the sensing devices being disposed along a straight line transverse to the line of movement of the conveyer. The sensing devices consist of photo-electric cells which receive beams of light from sources above the conveyer. As shown in FIGURE 1b, the sensing devices 12 each consist of a housing 48 placed below the conveyer and containing a photo-electric cell. A part of one of the conveyer belts 49 is shown slidingly supported by a table 50 having an opening 51 through which a beam of light 52 from a light source 53 passes down between the belt 49 and the adjacent belt to the sensing device 48. Alternatively they may consist of upwardly projecting fingers arranged to operate contacts when they are deflected. In another arrangement the conveyor could consist of a single wide belt and a series of fingers projecting downwardly from a transverse bar carried above the conveyor, and adapted to operate contacts when deflected, could form the sensing devices. Whatever their physical form, the purpose of the sensing devices is to provide an individual signal from each device when any part of the pattern passes it.

The element 13 is a leather hide which is to be sprayed with a dye or other substance. It is thus the article upon which the desired operation is to be carried out and it constitutes its own pattern. It will, however, be understood that in other embodiments of the invention the pattern and the article may be separate.

The block 14 represents a series of translating devices, one for each sensing device.

Since the sensing devices are of the photo-electric variety the block 14 contains an amplifier for each photoelectric device, by which its signals are amplified. If the sensing devices consist of fingers operating contacts, the block 14 may contain a relay for each finger. In other arrangements the devices in the block 14 may be unnecessary. The invention is in no way limited as to the kind or arrangement of the sensing devices employed provided that they are suitable for the purpose in hand.

The signals from the sensing devices or the block 14 are transmitted by a multi-way cable 15 to a multiple recording head 16 containing as many individual electromagnetic recording heads as there are sensing devices. The recording heads are arranged side by side across the width of a band of magnetic recording material 17 on the periphery of a drum 18 which rotates in synchronism with the movement of the conveyor 11. A multiple track magnetic recording head containing a plurality of individual electro-magnetic recording elements and suitable for use with the present invention is disclosed in the specification of United States Patent No. 2,923,779, granted on February 2, 1960, to Laszlo Namenyi-Katz and assigned to the assignees of the present invention. The direction of rotation of the drum is shown by the arrow. By "synchronism" is meant a fixed relationship between the rate of forward movement of the conveyer 11 and the circular movement of the recording material 17. The required relationship may be achieved by driving the shaft of the drum 18 through a synchronous transmission system, for example a synchro system comprising a transmitter 19 and receiver 20, the former being coupled to one of the driving shafts of the conveyer and the other to the drum shaft, gearing being employed to provide the desired ratio.

A conventional synchronous transmission system comprises two machines similar in shape to electric motors but having a structure similar to three-phase alternators, the rotor of each machine having a single winding energized from an alternating current supply which produces an alternating field having its axis placed across a diameter of the stator, the angular position of the axis of the field depending upon the rotational position of the rotor. The alternating field induces voltages in the three equally spaced stator windings, the magnitudes of the voltages in the individual windings being different, and each depending upon the rotational position of the rotor with respect to the particular winding. The three windings are connected respectively to the stator windings of the second machine, where the currents flowing produce, by combination, an alternating magnetic field whose axis corresponds in angular position with the axis of the field in the first machine. The rotor of the second machine, being also connected to the alternating current supply, sets up its own alternating magnetic field. If the rotor of the first machine is held then the interaction of the two magnetic fields in the second machine causes the rotor thereof to turn itself so that the alternating magnetic field of its rotor is in alignment with the alternating magnetic field set up by its three stator windings. If the rotor of the first machine is rotated then the rotor of the second machine follows this rotation exactly. In the case of the instant invention the synchro transmitter 19 is driven by one of the shafts driving the conveyer and its rotation causes the receiver 20 to drive the drum 18 in exact synchronism, there being interposed gearing if desired, as herein mentioned, to provide any required velocity ratio between the movement of the conveyer and the rotation of the drum 18. A precisely detailed description of the operation of a synchro system, with circuit diagrams, may be found in "U.S. Navy Synchros," BuOrd publication No. OP. 1305, issued by the United States Bureau of Weapons.

The magnetic recording surface of the drum 18 may be provided by cementing a length of ordinary magnetic recording tape, of the appropriate width, around the drum periphery or by depositing a coating having the required characteristics directly on to the drum surface.

As the conveyer 11 moves forward in the direction of the arrow 21 the leather hide 13 passes over the line of sensing devices 12. In doing so its edge either obscures the beam of light or moves the finger of individual sensing devices and each sensing device, when operated, delivers a signal to the associated recording head. Conveniently it may be arranged that each sensing device, when operated, switches on a continuous recording signal, which may be a 50-cycle or 60-cycle voltage derived from the supply mains. When the rear edge of any part of the hide 13, or any other pattern which may be used, passes over a sensing device the sensing device returns to the unoperated condition and the recording signal is switched off.

FIGURE 1c shows the recorded analogue of the shape of the hide on the magnetic surface, it being understood that it is invisible, but has been made visible in the drawing for the purpose of explanation. As shown, a portion of the surface 17 of the drum 18 is contacted by the individual heads of the multiple track recording head 16, which trace a series of parallel tracks along the surface 17, indicated by dotted lines 55, as the drum rotates. As individual heads are activated by the respective sensing devices, due to parts of the hide passing over them, they begin to record signals, indicated by the thickened lines 56. Since there is a recording head for each sensing device the signals are recorded simultaneously and side by side, so that the recorded tracks form a pattern which corresponds to the shape of the hide.

When the whole of the hide 13 has passed over the line of sensing devices 12 an analogue of the shape of the hide will have been recorded on the magnetic material 17.

After passing the line of sensing devices the hide 13 moves on until it reaches a position shown in FIGURE 1a.

In the embodiment of the invention being described the two portions of the conveyer shown are bound to move at the same speed since they are parts of the same conveyor. In other embodiments of the invention however, the second portion shown in FIGURE 1a might be a separate work-table, conveyer or other transporting device. In that case it would be necessary to ensure that it moves either at exactly the same speed or at a speed related to that of the first portion containing the sensing devices. For this purpose a further synchro receiver might be employed either to drive the second portion directly through gearing or to control a suitable servo device to produce the required rate of movement.

Four spray guns 24, 25, 26 and 27 are arranged near the end of the second conveyer portion. Each spray gun has an electro-magnetic actuator by which it may be turned on or off, the actuator of the gun 24 being marked 24' and the others being marked in a corresponding manner. The four spray guns are adapted to be reciprocated along paths transverse to the line of movement of the conveyer, the paths being indicated by chain dotted lines. Any suitable type of reciprocating mechanism may be employed. The spray guns are fed with liquid for spraying through a flexible pipe 28.

Many different reciprocating mechanisms may be employed, of kinds generally known in the mechanical field. For example, numerous mechanisms are described in chapter 9 of "Ingenious Mechanisms for Designers and Inventors," The Industrial Press, New York, 1935, and many additional examples may be found in chapter 8 and chapter 9, volume 2, of the same work, published in 1936.

Four electro-magnetic reproducing heads 29, 30, 31 and 32 are spaced at intervals along the path of the magnetic material 17 and are in contact therewith. They are arranged so that they may be reciprocated over the magnetic material along paths transverse to the path of the magnetic material, that is to say, along paths parallel to the axis of the drum 18, the mechanism for reciprocation being of any convenient type. The reciprocation of the reproducing heads is synchronized with the reciprocation of the spray guns. The required synchronization may conveniently be obtained by the use of synchros.

The spacing between the line of sensing devices 12 and the first spray gun 24 and the spacing between the recording heads 16 and the first reproducing head 29 are such that the time required for a point on the conveyer to travel from the sensing devices to the first spray gun is exactly the same as the time required for a point on the periphery 17 to travel from the recording head to the first reproducing head. In the same way the spacing between the individual spray guns and the spacing between the individual recording heads is such that the time required for a point on the conveyer to travel from one spray gun to the next is exactly equal to the time required for a point on the periphery 17 to travel from one reproducing head to the next.

The reproducing head 29 is connected through a suitable amplifier 33 to the magnetic actuator 24' which controls the spray gun 24. In the same way, the reproducing heads 30, 31 and 32 are connected through amplifiers (not shown) respectively to the magnetic actuators 25', 26' and 27'.

As the result of their reciprocating movement the reproducing heads scan the width of the magnetic material and deliver a signal whenever they are passing over any portion of the recorded analogue.

The operation of this portion of the apparatus is as follows. When the front edge of the hide 13 reaches the first spray gun the front edge of the recorded analogue on the magnetic material reaches the first reproducing head. As the spray gun passes across the edge of the hide the reproducing head passes across the edge of the recorded analogue and produces a signal which, after being amplified by the amplifier 33, turns the spray on by means of the actuator 24'. As the spray gun passes over the far edge of the hide the reproducing head passes over the far edge of the analogue so that the signal ceases and the spray gun is turned off. As the hide moves it comes successively under the second, third and fourth spray guns and at corresponding moments the second, third and fourth reproducing heads begin to scan the analogue. In this way the whole area of the hide is sprayed by each of the spray guns in turn but the spraying liquid is not distributed over the conveyer and none of the liquid is wasted.

As the magnetic material 17 continues its movement it passes an erasing head 34 provided with a suitable erasing signal by means not shown, so that the recorded analogue is erased and it then moves on to the recording heads 16 where a new analogue may be recorded.

With the apparatus described leather hides, each of a different shape, may be placed, one behind the other, on the conveyer so that an analogue of the individual shape of each hide is recorded and the hide is then automatically sprayed. The process is continuous and automatic.

The invention lends itself to many purposes. For example, the first portion of the conveyer 11 shown in FIGURE 1 might be quite small and adapted to carry a small cardboard pattern while the second portion shown in FIGURE 1a might be replaced by a large work-table upon which a plank of wood can be clamped. The spray guns could be replaced by a work head having a motor and a router cutter arranged so that upon receipt of a signal from the amplifier 33 the cutter is lowered to penetrate the plank to a desired depth. In operation the cutter would be fed into and out of the plank as it travels to and fro so that it would excavate a cavity whose shape corresponds to that of the cardboard pattern.

FIGURES 2 to 5 show an alternative arrangement of the reproducing heads and spray guns of the leather spraying apparatus. The conveyer and sensing devices of FIGURE 1 remain unchanged. As shown in FIGURE 2, the drum 18, magnetic material 17, recording head 16 and erasing head 34 are arranged in a similar manner to that shown in FIGURE 1. The arrangement of the reproducing heads is, however, different. Four units 35, 36, 37 and 38 each containing a reproducing head, are arranged to scan the magnetic material in a circular path. The mechanism must be so arranged that the reproducing heads are maintained in true radial relationship to the axis of the drum, indicated at 35', 36', 37', and are not themselves rotated. FIGURE 3 shows a side elevation of the drum with the four head units, the circular path of the head units being shown by a dotted line.

As seen in FIGURE 4, four spray guns 40, 42, 44, and 46 are mounted on arms extending from a hub mounted on the end of a shaft arranged for rotation about a vertical axis. Above the hub is a series of sliprings 47 (FIGURE 5) which are in contact with brushes carried in brush holders attached to the fixed framework. By means of the sliprings and brushes electrical control signals may be transmitted from the amplifiers associated with the individual reproducing heads to the magnetic actuators of the associated spray guns.

The four reproducing heads are moved in their circular path in synchronism with the rotation of the arms carrying the spray guns and as the recorded analogue is scanned the spray guns are turned on and off in order to spray the whole surface of the hide without spraying the conveyor.

I claim:

1. Apparatus for carrying out an operation on an article comprising means to move a shaped pattern along a line, a plurality of sensing devices adapted to provide signals disposed in a fixed line across the line of pattern movement and responsive to the passage of any part of said pattern therepast, material having a magnetic recording surface, means to move said surface in a predetermined path in synchronism with said pattern moving means, a plurality of electro-magnetic recording heads equal to the number of said sensing devices disposed in a line across the path of said surface, each sensing device being connected to apply signals to the recording head in the corresponding position in the line, whereby synchronous movement of said pattern moving means and said surface causes the signals from all of said sensing devices influenced by the passage of said pattern to be magnetically recorded simultaneously and side by side on said surface to form a magnetic record of the shape of said pattern, means to move said article along a line in synchronism with the movement of said surface, movably mounted work means for carrying out the desired operation, means to move said work means in a desired path relative to the line of movement of said article, a movable electro-magnetic reproducing head adapted to provide signals, means to move said reproducing head over said surface in synchronism with the movement of said work means in a path corresponding to the path thereof to scan said magnetic record, and control means responsive to the signals from said reproducing head for actuating said work means, whereby said operation is carried out in accordance with said magnetic record.

2. Apparatus for carrying out an operation on an article comprising means to move a shaped pattern along a straight line, a plurality of sensing devices disposed in a straight line transverse to the line of pattern movement and adapted to provide signals in response to the passage of any part of said pattern therepast, a rotatable drum having magnetic recording material around its periphery, means to rotate said drum in synchronism with the movement of said pattern moving means, a plurality of electro-magnetic recording heads equal to the number of sensing devices disposed in a line parallel to the axis of said drum and adapted to record signals on said recording material, each sensing device being connected to apply signals to the recording head in the corresponding position in the line, whereby movement of said pattern moving means and synchronous rotation of said drum causes the signals from all of said sensing devices influenced by the passage of said pattern to be magnetically recorded simultaneously and side by side on said recording material to produce a magnetic record of the shape of said pattern, means to move said article along a straight line in synchronism with the rotation of said drum, work means for carrying out the desired operation, means to reciprocate said work means across the path of said article, an electro-magnetic reproducing head adapted to provide signals, means to reciprocate said reproducing head across the path of said recording material in synchronism with the reciprocation of said work means to scan said magnetic record, and control means responsive to the signals from said reproducing head for actuating said work means, whereby said operation is carried out in accordance with said magnetic record.

3. Apparatus as claimed in claim 2 comprising a plurality of work means spaced along the line of movement of said article and a like number of reproducing heads spaced along the path of said recording material, the spacing between said work means on the one hand and said reproducing heads on the other hand being such that the time required for the article to move from one work means to the next is equal to the time required for the magnetic material to move from one reproducing head to the next.

4. Apparatus for carrying out an operation on an article comprising means to move a shaped pattern along a straight line, a plurality of sensing devices disposed in a straight line transverse to the line of pattern movement and adapted to provide signals in response to the passage of any part of said pattern therepast, a rotatable drum having magnetic recording material around its periphery, means to rotate said drum in synchronism with the movement of said pattern moving means, a plurality of electro-magnetic recording heads equal to the number of sensing devices disposed in a line parallel to the axis of said drum and adapted to record signals on said recording material, each sensing device being connected to apply signals to the recording head in the corresponding position in the line, whereby movement of said pattern moving means and synchronous rotation of said drum causes the signals from all of said sensing devices influenced by the passage of said pattern to be magnetically recorded simultaneously and side by side on said recording material to produce a magnetic record of the shape of said pattern, means to move said article along a line in synchronism with the rotation of said drum, work means rotatable in a circular path over the path of said article for carrying out the desired operation, electro-magnetic reproducing means adapted to reproduce the signals recorded on said recording material movable in a circular path over said recording material in synchronism with the movement of said work means, and control means responsive to the signals reproduced by said reproducing means for actuating said work means, whereby the operation is carried out under the control of said magnetic record analogue.

5. Apparatus as claimed in claim 2 wherein said control means comprises an electro-magnetic actuator for said work means, and an amplifier between said reproducing head and said actuator.

6. Apparatus as claimed in claim 4 wherein said control means comprises electro-magnetic actuating means for said work means, and amplifier means between said reproducing means and said actuating means.

7. Apparatus as claimed in claim 4 wherein said article constitutes its own pattern, and said article moving means comprises a conveyer which moves across the line of sensing devices and also intercepts the path of said work means.

8. Apparatus for spraying leather hides comprising a conveyer for moving hides to be sprayed, a plurality of sensing devices arranged in a line transverse to the line of conveyer movement and adapted to provide signals in response to the passage of any part of a hide therepast, a rotatable drum having magnetic recording material around its periphery, means to move said conveyor and rotate said drum in synchronism, a plurality of electro-magnetic recording heads equal to the number of sensing devices disposed in a line parallel to the axis of said drum and adapted to record signals on said recording material, each sensing device being connected to apply signals to the recording head in the corresponding position in the line, whereby movement of said conveyer and synchronous rotation of said drum causes magnetic records corresponding to the shapes of said hides to be recorded on said recording material, spray means arranged for reciprocating movement across the path of said conveyer, electro-magnetic reproducing means arranged for synchronous reciprocating movement across the path of said recording material, the spacing between said line of sensing devices and said spray means on the one hand and the spacing between said recording heads and said reproducing means on the other hand being such that the time required for a hide to move from said line of sensing devices to said spray means is equal to the time required for said recording material to move from said recording heads to said reproducing means, electro-magnetic actuating means for said spray means, and amplifier means connected between said reproducing means and said actuating means, whereby the operation of said spray means is controlled by signals reproduced by said reproducing means from said magnetic records.

9. Apparatus as claimed in claim 8 wherein said spray means comprises a plurality of spray guns spaced along the line of conveyer movement, said reproducing means comprises a like number of reproducing heads spaced around said drum, the spacing between individual spray guns on the one hand and the spacing between individual reproducing heads on the other hand being such that the time required for a hide to move from one spray gun to the next is equal to the time required for said recording material to move from one reproducing head to the next, said actuating means comprises a separate actuator for each spray gun, and said amplifier means comprises a separate amplifier connected between each reproducing head and the associated actuator.

10. Apparatus as claimed in claim 8 comprising an electro-magnetic erasing head disposed between said reproducing means and said recording heads to erase said recorded analogues.

11. Apparatus for spraying leather hides comprising a conveyer for moving hides to be sprayed, a plurality of sensing devices arranged in a line transverse to the line of conveyer movement and adapted to provide signals in response to the passage of any part of a hide therepast, a rotatable drum having magnetic recording material around its periphery, means to move said conveyer and said drum in synchronism, a plurality of electro-magnetic recording heads equal to the number of sensing devices disposed in a line parallel to the axis of said drum and adapted to record signals on said recording material, each sensing device being connected to apply signals to the recording head in the corresponding position in the line, whereby movement of said conveyer and synchronous rotation of said drum causes analogues of the shapes of said hides to be recorded on said recording material, spray means arranged to move in a circular path over the path of said conveyer, electro-magnetic reproducing means adapted to reproduce signals recorded in said analogues, means to move said reproducing means in a circular path over the path of said recording material in synchronism with the movement of said spray means, the spacing between said line of sensing devices and the centre of the circular path of said spray means on the one hand and the spacing between said recording heads and the centre of the circular path of said reproducing means on the other hand being such that the time required for a hide to move from said line of sensing devices to said centre of the path of said spray means is equal to the time required for said recording material to move from said recording heads to said centre of the path of said reproducing means, electro-magnetic actuating means for said spray means, and amplifier means connected between said reproducing means and said actuating means, whereby the operation of said spray means is controlled by signals reproduced by said reproducing means from said recorded analogue.

12. Apparatus as claimed in claim 11 wherein said spray means comprises a plurality of spray devices equally spaced around said spray means circular path, each spray device consisting of at least one spray gun, said reproducing means comprises a number of reproducing devices equal to the number of spray devices equally spaced around said reproducing means circular path, each reproducing device consisting of one reproducing head for each spray gun of a spray device, said actuating means comprises a separate actuator for each spray gun, and said amplifier means comprises a separate amplifier connected between each reproducing head and the associated actuator.

13. Apparatus for carrying out an operation on an article comprising means to move said article along a straight line, a plurality of sensing devices disposed in a straight line transverse to the line of movement of said article and adapted to provide signals in response to the passage of any part of said article therepast, a rotatable drum having magnetic recording material around its periphery, means to rotate said drum in synchronism with the movement of said article moving means, a plurality of electromagnetic recording heads equal to the number of sensing devices disposed in a line parallel to the axis of said drum and adapted to record signals on said recording material, each sensing device being connected to apply signals to the recording head in the corresponding position in the line, whereby movement of said article moving means and synchronous rotation of said drum causes the signals from all said sensing devices influenced by the passage of said article to be magnetically recorded simultaneously and side by side on said recording material to produce a magnetic record of the shape of said article, work means spaced from said sensing devices reciprocable across the path of said article for carrying out the desired operation, an electro-magnetic reproducing head spaced from said recording head adapted to provide signals reciprocable across the path of said recording material in synchronism with the reciprocation of said work means to scan said magnetic record, and control means responsive to the signals from said reproducing head for actuating said work means, whereby said operation is carried out in accordance with said magnetic record.

References Cited in the file of this patent

UNITED STATES PATENTS

| | | |
|---|---|---|
| 2,754,795 | Enssle | July 17, 1956 |
| 2,882,476 | Wetzel | Apr. 14, 1959 |